United States Patent
Conroy et al.

(10) Patent No.: US 11,612,863 B2
(45) Date of Patent: Mar. 28, 2023

(54) CARBONATION SYSTEM FOR BEVERAGE MACHINE

(71) Applicant: BEDFORD SYSTEMS LLC, Bedford, MA (US)

(72) Inventors: Paul Conroy, Nashua, NH (US); William Mendelson, Cambridge, MA (US)

(73) Assignee: Bedford Systems LLC, Bedford, MA (US)

(*) Notice: Subject to any disclaimer, the term of this patent is extended or adjusted under 35 U.S.C. 154(b) by 1000 days.

(21) Appl. No.: 16/362,262

(22) Filed: Mar. 22, 2019

(65) Prior Publication Data

US 2019/0291064 A1    Sep. 26, 2019

Related U.S. Application Data

(60) Provisional application No. 62/646,559, filed on Mar. 22, 2018.

(51) Int. Cl.
*B01F 23/23*     (2022.01)
*B01F 23/236*    (2022.01)
(Continued)

(52) U.S. Cl.
CPC .......... *B01F 23/2362* (2022.01); *A23L 2/54* (2013.01); *B01F 23/231* (2022.01);
(Continued)

(58) Field of Classification Search
CPC ... B01F 23/231; B01F 23/236; B01F 23/2363
See application file for complete search history.

(56) References Cited

U.S. PATENT DOCUMENTS 4,028,441 A    6/1977  Richards
4,040,342 A    8/1977  Austin et al.
(Continued)

FOREIGN PATENT DOCUMENTS

CN    101193813 A    6/2008
CN    103423936 A    12/2013
(Continued)

OTHER PUBLICATIONS

International Search Report and Written Opinion for International Application No. PCT/US2019/023638, dated Jul. 8, 2019.
(Continued)

*Primary Examiner* — Robert A Hopkins
(74) *Attorney, Agent, or Firm* — Dorsey & Whitney LLP

(57) ABSTRACT

A carbonation system for a beverage appliance or machine that can include a liquid chamber and a carbonation chamber separated from the liquid chamber by a wall of the carbonation chamber is disclosed herein. In some implementations, the liquid chamber is defined by a liquid tank (e.g., a water tank), and the carbonation chamber is defined by a carbonation tank. The carbonation system can move liquid (e.g., water) from the liquid chamber to the carbonation chamber and introduce carbonating gas (e.g., carbon dioxide) into the carbonation chamber to create a carbonated liquid (e.g., a carbon dioxide water dissolution, such as carbonated water, sparkling water, or seltzer).

18 Claims, 11 Drawing Sheets

(51) Int. Cl.

| | | |
|---|---|---|
| *A23L 2/54* | (2006.01) | |
| *B67D 1/04* | (2006.01) | |
| *B01F 23/231* | (2022.01) | |
| *B01F 23/70* | (2022.01) | |
| *B67D 1/00* | (2006.01) | |
| B01F 23/237 | (2022.01) | |
| B01F 35/90 | (2022.01) | |

(52) U.S. Cl.
CPC ........ *B01F 23/236* (2022.01); *B01F 23/2363* (2022.01); *B01F 23/23121* (2022.01); *B01F 23/702* (2022.01); *B67D 1/0071* (2013.01); *B67D 1/0406* (2013.01); *A23V 2002/00* (2013.01); *B01F 23/237621* (2022.01); *B01F 2035/98* (2022.01); *B67D 2210/00097* (2013.01); *B67D 2210/00146* (2013.01)

(56) References Cited

U.S. PATENT DOCUMENTS

| | | |
|---|---|---|
| 4,636,337 A | 1/1987 | Gupta et al. |
| 4,764,315 A | 8/1988 | Brusa |
| 4,950,431 A | 8/1990 | Rudick et al. |
| 5,182,084 A | 1/1993 | Plester |
| 6,712,342 B2 | 3/2004 | Bosko |
| 6,981,387 B1 | 1/2006 | Morgan |
| 8,481,971 B2 * | 7/2013 | Kim ........................ C02F 9/005 422/23 |
| 2008/0210408 A1 | 9/2008 | Sterngold et al. |
| 2016/0106136 A1 | 4/2016 | Gordon et al. |
| 2016/0256837 A1* | 9/2016 | Wilder ................ B01F 23/2362 |
| 2017/0349421 A1 | 12/2017 | Cleland et al. |

FOREIGN PATENT DOCUMENTS

| | | | |
|---|---|---|---|
| CN | 203474432 U | 3/2014 | |
| CN | 204811874 U | 12/2015 | |
| EP | 3244157 A1 | 11/2017 | |
| GB | 2143016 A | 1/1985 | |
| GB | 0031627 | 2/2001 | |
| JP | 2003231593 A * | 8/2003 | |
| MX | 2015003180 A | 7/2015 | |
| WO | 2008124851 A1 | 10/2008 | |
| WO | WO-2015151868 A1 * | 10/2015 | ............ B01F 15/065 |
| WO | 2017057124 A1 | 4/2017 | |

OTHER PUBLICATIONS

Extended European Search Report for EP Application No. 19770887.8 dated Nov. 12, 2021.
Yang, et al., "Modem Food Processing II", Sep. 30, 2006, 499-502.
Gao, Yuangun, et al., "Beverage Processing Technology", Aug. 31, 2012, 75-76.

* cited by examiner

CARBONATION SYSTEM FOR BEVERAGE MACHINE

CROSS-REFERENCE TO RELATED APPLICATION

This patent application is a non-provisional patent application of, and claims priority to, U.S. Provisional Patent Application No. 62/646,559, filed Mar. 22, 2018, and titled "Carbonation System for Beverage Machine," the disclosure of which is hereby incorporated by reference in its entirety.

FIELD

The present disclosure relates generally to a beverage machine, and more particularly to a carbonation system for a beverage machine.

BACKGROUND

Carbonated beverage machines generally include a carbonation system that dissolves gas (e.g., carbon dioxide) in a liquid (e.g., water) to prepare a carbonated beverage. Carbonation systems are described in a wide variety of publications, including U.S. Pat. Nos. 4,025,655; 4,040,342; 4,636,337; 5,182,084; 6,712,342; U.S. Pat. Pub. No. 2016/0106136; and PCT Publication WO 2008/124851.

SUMMARY

In various embodiments, a carbonation assembly or system is disclosed. The carbonation system can form part of a beverage machine for preparing a carbonated beverage.

In various embodiments, the carbonation system can include a liquid tank and a carbonation tank. The carbonation tank can be positioned in the liquid tank. By positioning the carbonation tank in the liquid tank, the carbonation system can realize a thermal benefit and/or a space benefit. For example, positioning the carbonation tank in the liquid tank can facilitate cooling of the carbonation tank via the liquid tank, and/or can reduce the footprint of the beverage machine by reducing the overall size of the carbonation system.

In various embodiments, the carbonation system can include a liquid chamber and a carbonation chamber. The carbonation chamber can include a wall that separates the carbonation chamber from the liquid chamber. By separating the carbonation chamber from the liquid chamber via a wall, the carbonation system can realize a thermal benefit and/or a space benefit. For example, separating the carbonation chamber from the liquid chamber by a wall can facilitate cooling of the carbonation chamber via the liquid chamber, and/or can reduce the footprint of the beverage machine by reducing the overall size of the carbonation system.

In various embodiments, a method of carbonating a liquid is disclosed. The method can include moving liquid from a first tank to a second tank positioned in the first tank, and introducing pressurized gas to the liquid in the second tank to carbonate the liquid.

In another of the various embodiments, a carbonation system for a beverage machine is disclosed. The carbonation system can include a liquid tank. The carbonation system can further include a carbonation tank positioned in the liquid tank.

In another embodiment, the carbonation system can further include an annular space defined between the liquid tank and the carbonation tank. The liquid tank can be configured to receive liquid in the annular space surrounding the carbonation tank. Additionally or alternatively, the carbonation system can be configured to move the liquid from the liquid tank to the carbonation tank and introduce pressurized gas to the carbonation tank.

In another embodiment, the carbonation system can further include a cover attached to the liquid tank and the carbonation tank. The cover can be configured to limit relative movement between the liquid tank and the carbonation tank. The cover can include a first port in fluid communication with the liquid tank. The cover can further include a second port in fluid communication with the carbonation tank.

In another embodiment, the carbonation system can further include a stem positioned in the carbonation tank and attached to the cover. The stem can be configured for introducing pressurized gas into the carbonation tank. In some cases, the carbonation system can further include a first probe attached to the cover and extending into the liquid tank to determine a liquid level in the liquid tank. In this regard, the carbonation system can further include a second probe attached to the cover and extending into the carbonation tank to determine a liquid level in the carbonation tank. The carbonation system can also include a cooling system mounted to the liquid tank.

In another of the various embodiments, a carbonation system for a beverage machine is disclosed. The carbonation system includes a liquid chamber. The carbonation system further includes a carbonation chamber including a wall. The wall can separate the carbonation chamber from the liquid chamber.

In another embodiment, the carbonation chamber can be disposed in the liquid chamber. The liquid chamber can be configured to receive a liquid such that the liquid contacts the wall of the carbonation chamber.

In another embodiment, the carbonation system can further include a cover forming a barrier between the liquid and carbonation chambers and an external environment. The carbonation chamber can be fluidly coupled to the liquid chamber via the cover.

In another embodiment, the carbonation system can further include a cooling system configured to cool liquid in the liquid chamber. In some cases, a shell can surround the carbonation and liquid chambers.

In another of the various embodiments, a carbonation system for a beverage machine is disclosed. The carbonation system includes a carbonation tank. The carbonation system further includes a liquid tank defining an insulating region around the carbonation tank.

In another embodiment, the carbonation tank can be nested within the liquid tank. In this regard, the insulating region can include an annular space between the carbonation tank and the liquid tank configured to receive a chilled liquid.

In another embodiment, the liquid and carbonation tanks can be fluidically coupled for selective transfer of chilled water from the liquid tank to the carbonation tank. In some cases, the carbonation system can further include a stem received at least partially within the carbonation tank and configured to introduce pressurized gas into the carbonation tank when the carbonation tank has a threshold volume of the chilled water.

The term "carbonation" or "carbonated" is used herein to generically refer to beverages that have a dissolved gas, such as carbon dioxide, nitrogen, oxygen, air, or other gas. The present disclosure is not limited to forming beverages that have a dissolved carbon dioxide content, but rather can include any dissolved gas.

This summary of the disclosure is given to aid understanding. Each of the various aspects and features of the disclosure can advantageously be used separately in some instances, or in combination with other aspects and features of the disclosure in other instances. Accordingly, while the disclosure is presented in terms of examples, individual aspects of any example can be claimed separately or in combination with aspects and features of that example or any other example.

This summary is neither intended nor should it be construed as being representative of the full extent and scope of the present disclosure. The present disclosure is set forth in various levels of detail in this application and no limitation as to the scope of the claimed subject matter is intended by either the inclusion or non-inclusion of elements, components, or the like in this summary.

BRIEF DESCRIPTION OF THE DRAWINGS

The accompanying drawings, which are incorporated in and constitute a part of the specification, illustrate examples of the disclosure and, together with the general description given above and the detailed description given below, serve to explain features of these examples.

Figure 1:
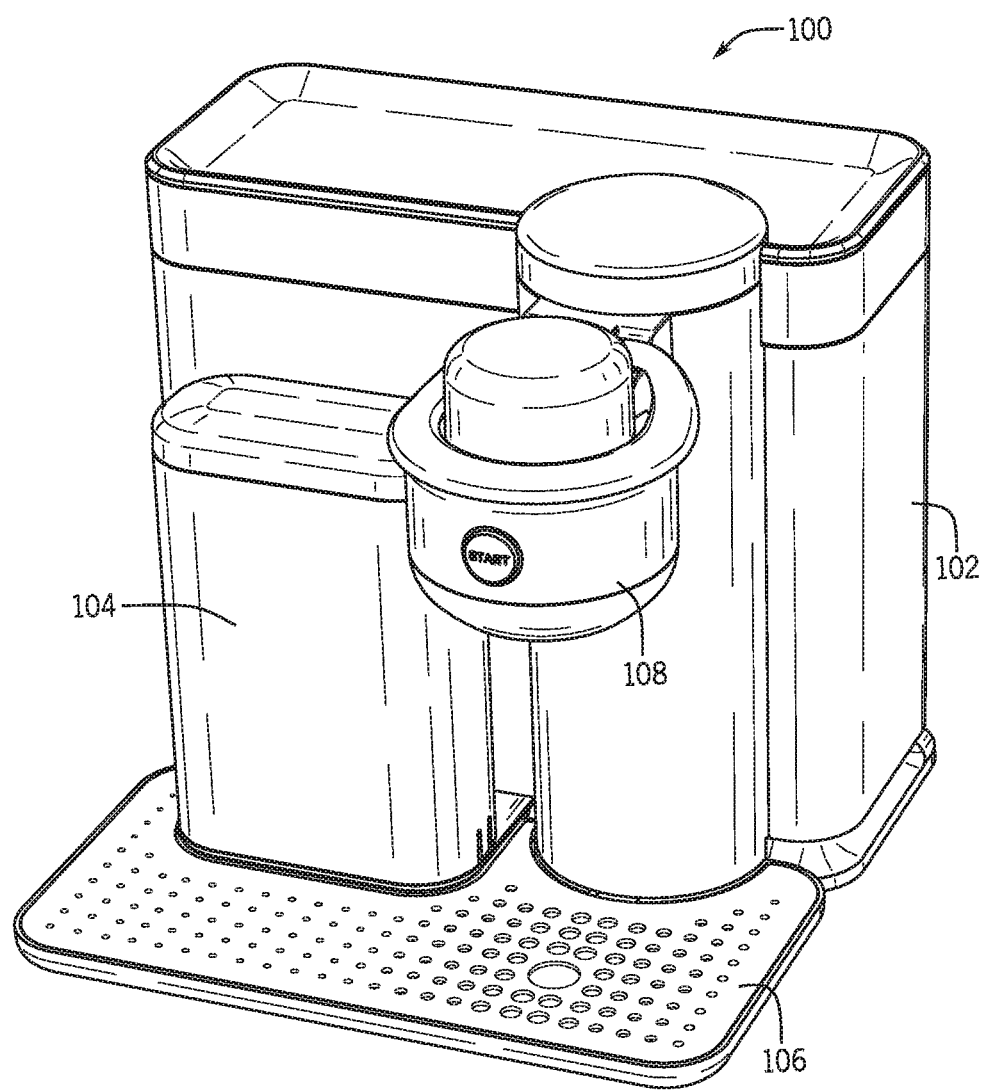
FIG. 1 is an isometric view of a beverage machine in accordance with various embodiments of the present disclosure.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Various embodiments of the present disclosure are directed to a carbonation system for a beverage appliance or machine. The carbonation system can include a liquid chamber and a carbonation chamber. The carbonation chamber can be separated from the liquid chamber by a wall, such as a wall of the carbonation chamber. In some implementations, the liquid chamber is defined by a liquid tank (e.g., water tank), and the carbonation chamber is defined by a carbonation tank. The carbonation system can move a liquid (e.g., water) from the liquid chamber to the carbonation chamber and introduce carbonating gas (e.g., carbon dioxide) into the carbonation chamber to create a carbonated liquid (e.g., carbon dioxide water dissolution, such as carbonated water, sparkling water, or seltzer).

In various embodiments, the carbonation chamber is positioned in the liquid chamber. For example, the carbonation tank can be nested within the liquid tank. Certain advantages can be provided by positioning the carbonation tank in the liquid tank. For example, by positioning the carbonation tank in the liquid tank, the outer envelope or volume of the carbonation system is reduced, enabling the carbonated beverage machine to have a smaller footprint than previous carbonated beverage machines, thereby occupying less of a user's countertop space, for example. As another example, by positioning the carbonation tank in the liquid tank, the carbonation tank can be cooled externally by liquid (e.g., water) in the liquid tank and internally by liquid transferred from the liquid tank to the carbonation tank, resulting in a communal environment having substantially the same temperature, thereby creating thermal benefits in maintaining a proper carbonation temperature in the carbonation tank.

Reference will now be made to the accompanying drawings, which assist in illustrating various features of the present disclosure. The following description is presented for purposes of illustration and description. Furthermore, the description is not intended to limit the inventive aspects to the forms disclosed herein. Consequently, variations and modifications commensurate with the following teachings, and skill and knowledge of the relevant art, are within the scope of the present inventive aspects.

FIG. 1 is an isometric view of a carbonated beverage appliance or machine 100, such as the carbonated beverage appliances discussed above and described in greater detail below. The beverage machine 100 can include a housing 102 that conceals or shields various components of the machine, a reservoir 104 that holds a liquid (e.g., water) used to form a beverage, and a drip tray 106 that supports a user's cup or other container for receiving a dispensed beverage. The reservoir 104 can be removable from the housing 102 such that a user can fill the reservoir 104 with a beverage precursor liquid, such as plain water, that is used to form a beverage dispensed at a dispensing station 108 into a user's container. The reservoir 104 can include a movable lid to facilitate a user in filling the reservoir 104 with the precursor liquid. In various embodiments, the reservoir 104 can be replaced by a plumbed connection to a direct or main water source. The beverage precursor liquid can be any suitable liquid, including water or any other suitable liquid used to form a beverage. The reservoir 104 or main water source can form part of a beverage precursor supply which provides a precursor liquid for conditioning of some kind (e.g., filtering, chilling, carbonating, mixing with a beverage medium, and dispensing as a beverage).

Various components of the beverage machine 100 can be located within the housing 102. For example, a pump can be located within the housing 102 and can move precursor liquid from the reservoir 104 to a carbonation system 110 (see, e.g., FIG. 2), where the precursor liquid can be chilled by a cooling system 112 (see, e.g., FIG. 4) and carbonated via a gas supplied by, for example, a pressurized canister or bottle, such as a carbon dioxide canister or bottle, which can be located within the housing 102. Cooling the precursor liquid in the carbonation system 110 can help the carbonation process, for example, because a cooler liquid tends to dissolve carbon dioxide or other gas more rapidly and/or is capable of dissolving a larger amount of gas. In some embodiments, the precursor liquid is cooled to about four degrees Celsius or lower to facilitate carbonation of the precursor liquid. The carbonated liquid can be moved from the carbonation system 110 to the dispensing station 108, where the carbonated liquid can be mixed with a beverage medium (e.g., a flavoring agent), and dispensed into a user's container. The beverage medium can be contained in a cartridge or pod received in the dispensing station 108. Pressurized gas can be introduced into the pod and can force the beverage medium out of the pod for mixing with the carbonated liquid prior to entering a user's container.

Control of the beverage machine 100 and its components can be performed by control circuitry, which can include a programmed general purpose computer and/or other data processing devices along with suitable software or other operating instructions, one or more memories (including non-transient storage media that can store software and/or other operating instructions), a power supply for the control circuitry and/or other system components, temperature and liquid level sensors, pressure sensors, RFID interrogation devices or other machine readable indicia readers (such as those used to read and recognize alphanumeric text, barcodes, security inks, etc.), input/output interfaces (e.g., such as a user interface to display information to a user and/or receive input from a user), communication buses or other links, a display, switches, relays, triacs, motors, mechanical linkages and/or actuators, and/or other components necessary to perform desired input/output or other functions of the beverage machine 100.

Figure 2:
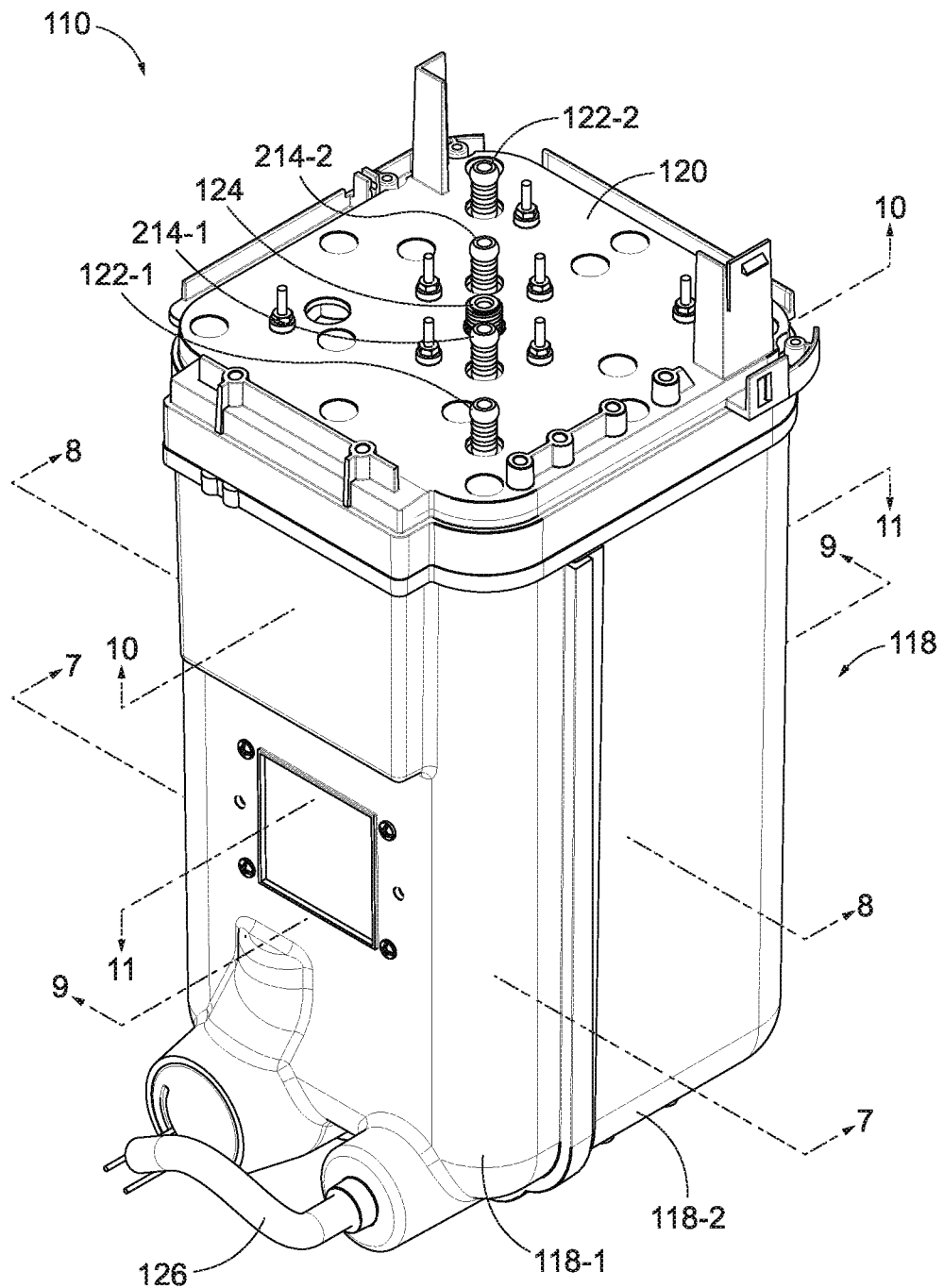
FIG. 2 is an isometric, top view of a carbonation system of the beverage machine of FIG. 1 in accordance with various embodiments of the present disclosure.
Figure 3:
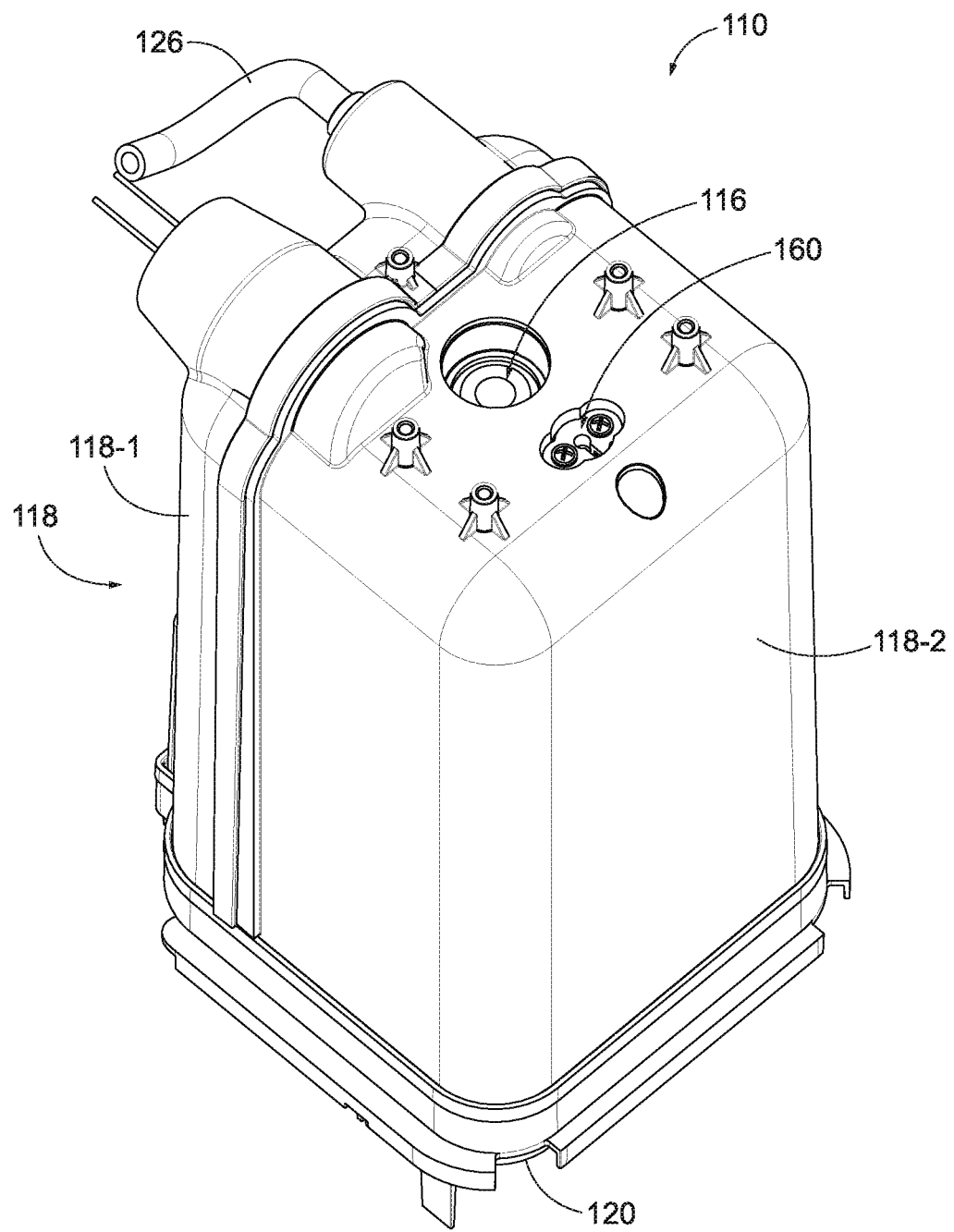
FIG. 3 is an isometric, bottom view of the carbonation system of FIG. 2 in accordance with various embodiments of the present disclosure.

FIGS. 2 and 3 are isometric views of the carbonation system 110 of the beverage machine 100 in accordance with various embodiments of the present disclosure. The carbonation system 110 can be located in the beverage machine 100 and concealed by the housing 102 (see FIG. 1). The carbonation system 110 can be referred to herein as a chiller or heat-exchange assembly. The carbonation system 110 can receive precursor liquid (e.g., non-carbonated water) from the reservoir 104, and can chill or cool the precursor liquid in preparation for carbonation. The carbonation system 110 can receive a carbonating gas from a gas source, such as a carbon dioxide canister or bottle disposed in the housing 102 (see FIG. 1), and the carbonating gas can be used to carbonate the precursor liquid. The carbonated fluid (e.g., carbonated water) can exit the carbonation system 110 through outlet 116 (see FIG. 3) and can be routed to the dispensing station 108 (see FIG. 1) for mixing with a beverage medium.

The carbonation system 110 can include an outer shell 118, which can include separate shell components 118-1, 118-2 that are attached together to enclose the sides and an end (e.g., a bottom) of the carbonation system 110. The other end (e.g., a top) of the carbonation system 110 can be enclosed by a cover (e.g., a cap) 120. Precursor liquid from the reservoir 104 (see FIG. 1) can enter into the carbonation system 110 through a port 122 (such as a first port 122-1 and/or a second port 122-2; see FIG. 2). The port 122 can be associated with the cover 120. In some embodiments, the precursor liquid can be pumped from the reservoir 104 into the carbonation system 110.

A pressurized gas (e.g., carbon dioxide) can enter into the carbonation system 110 through a port 124 (see FIG. 2), which can pass through the cover 120 adjacent the precursor-liquid port 122. The precursor liquid can be carbonated via the pressurized gas, and the resulting carbonated liquid can exit the carbonation system 110 through the carbonated-liquid outlet 116 (see FIG. 3), which can be formed through a bottom of the carbonation system 110. As illustrated in FIGS. 2 and 3, the carbonation system 110 can include a drain tube 126 for draining precursor liquid from the carbonation system 110. The carbonation system 110 can have a relatively small footprint. For example, as illustrated in FIGS. 2 and 3, the carbonation system 110 can be elongate, with a width and a depth that are smaller in dimension than its height.

Figure 4:
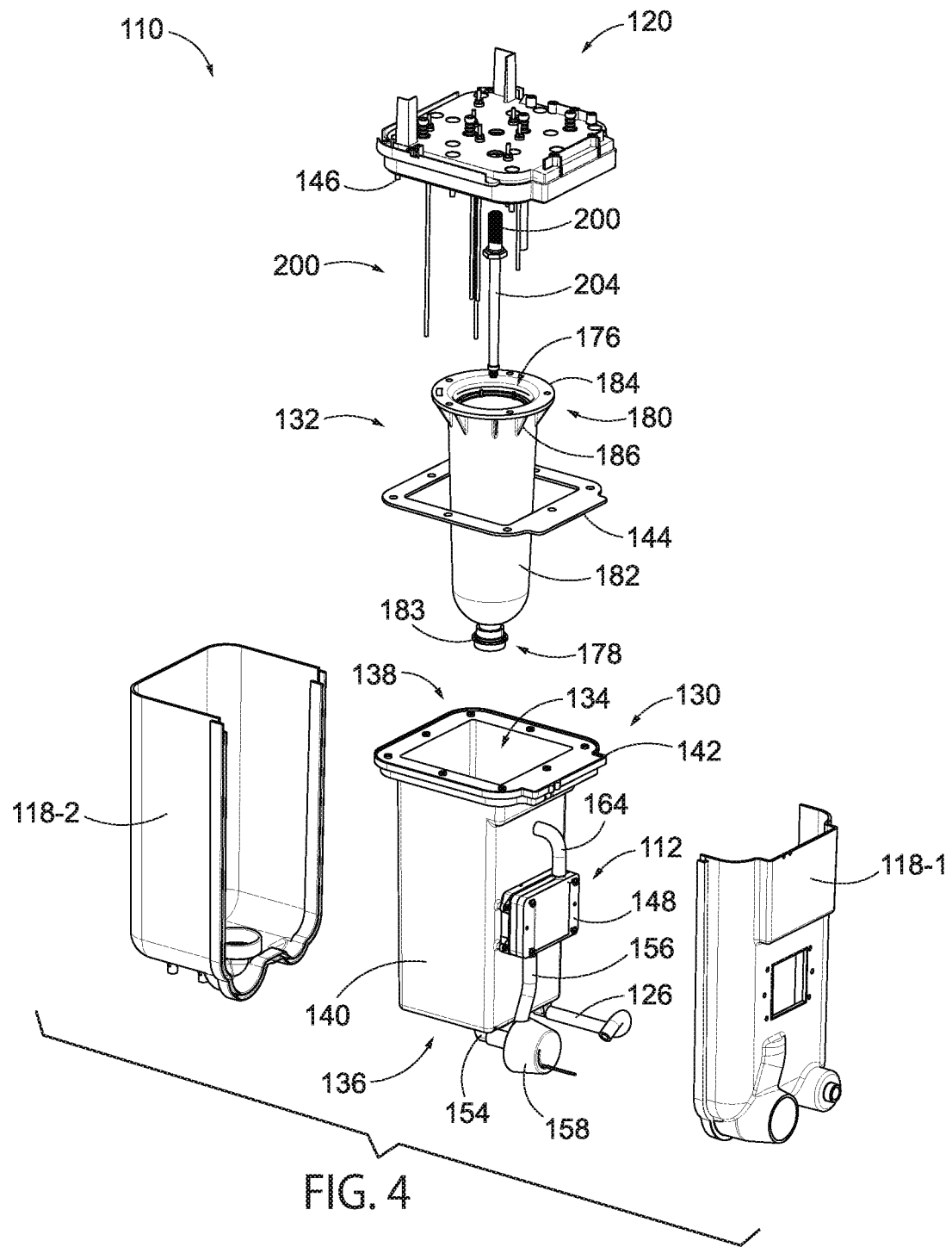
FIG. 4 is a partially exploded view of the carbonation system of FIG. 2 in accordance with various embodiments of the present disclosure.

FIG. 4 is a partially exploded view of the carbonation system 110 in accordance with various embodiments of the present disclosure. As illustrated in FIG. 4, the carbonation system 110 can include a liquid tank 130 and a carbonation tank 132. The liquid tank 130 can be configured to hold chilled water, and thus in various embodiments the liquid tank 130 can be referred to as a water tank or a cold water tank. The liquid tank 130 can define a liquid chamber 134 for receiving the precursor liquid from the reservoir 104. The liquid tank 130 can include a lower end 136, an upper end 138, and a sidewall 140 extending between the lower end 136 and the upper end 138. The sidewall 140 can have a rectangular shape as illustrated in FIG. 4. A flange 142 can extend outwardly from the sidewall 140 at the upper end 138 of the liquid tank 130 to facilitate attachment of the cover 120 to the liquid tank 130. A gasket 144 can be positioned between the cover 120 and the flange 142 to provide a fluid-tight seal between the cover 120 and the liquid tank 130. The cover 120 can be removably attached to the liquid tank 130, such as by fasteners 146 that connect the cover 120 to the flange 142.

Figure 5:
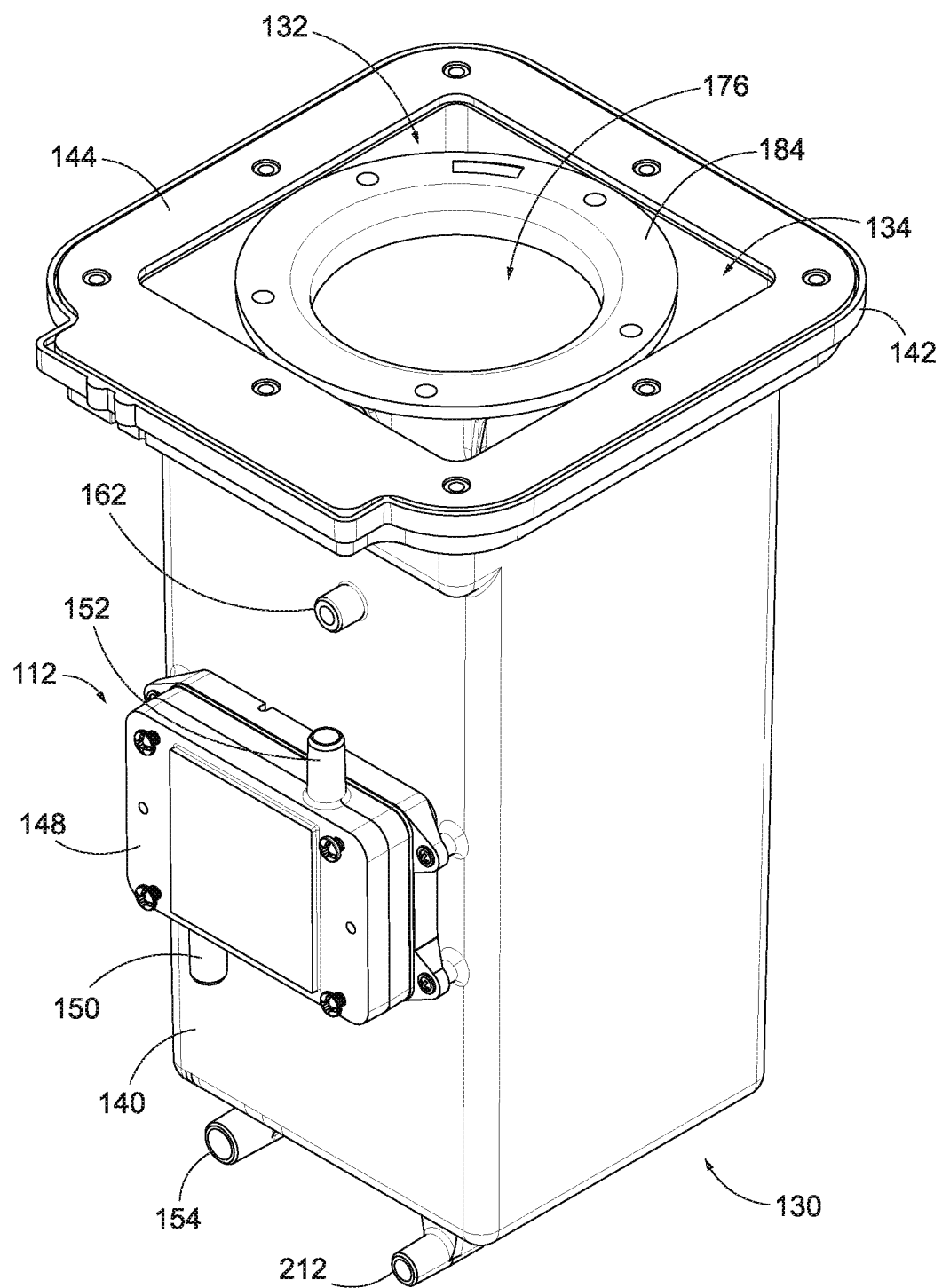
FIG. 5 is an isometric, fragmentary view of the carbonation system of FIG. 2 including a carbonation tank nested within a liquid tank, and a cooling system mounted to the liquid tank, in accordance with various embodiments of the present disclosure.
Figure 6:
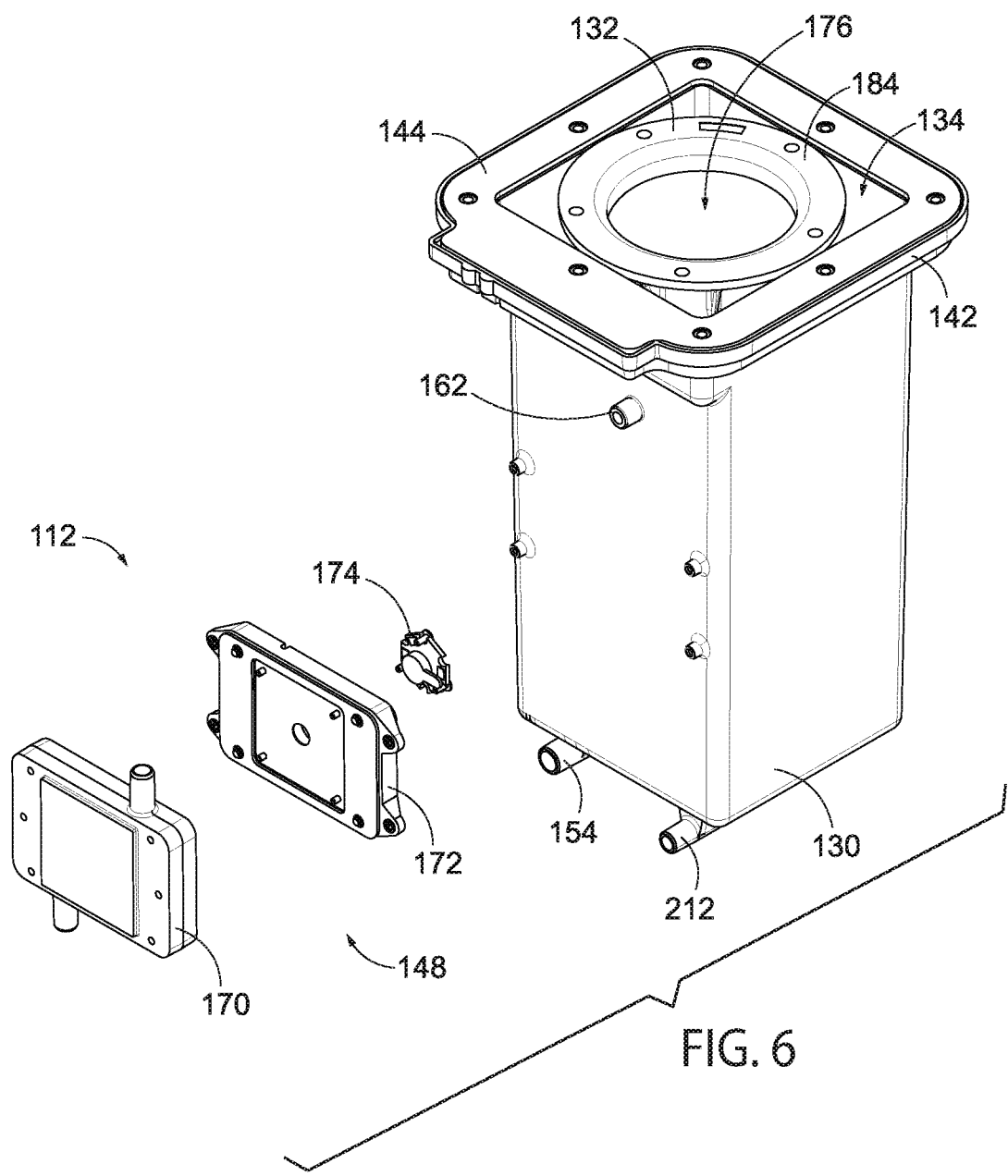
FIG. 6 is a partially exploded view of the carbonation system of FIG. 5 with the cooling system exploded from the liquid tank in accordance with various embodiments of the present disclosure.

The cooling system 112 can be coupled to the liquid tank 130 to reduce the temperature of the precursor liquid received in the liquid chamber 134 of the liquid tank 130. In various embodiments, the cooling system 112 is configured to cool the precursor liquid to facilitate carbonation of the liquid, such as to a temperature of about four degrees Celsius or lower. As illustrated in FIGS. 4-6, the cooling system 112 can be mounted to the sidewall 140 of the liquid tank 130. The cooling system 112 can recirculate the precursor liquid through the liquid tank 130, and during the recirculation process the cooling system 112 can cool the liquid.

Figure 11:
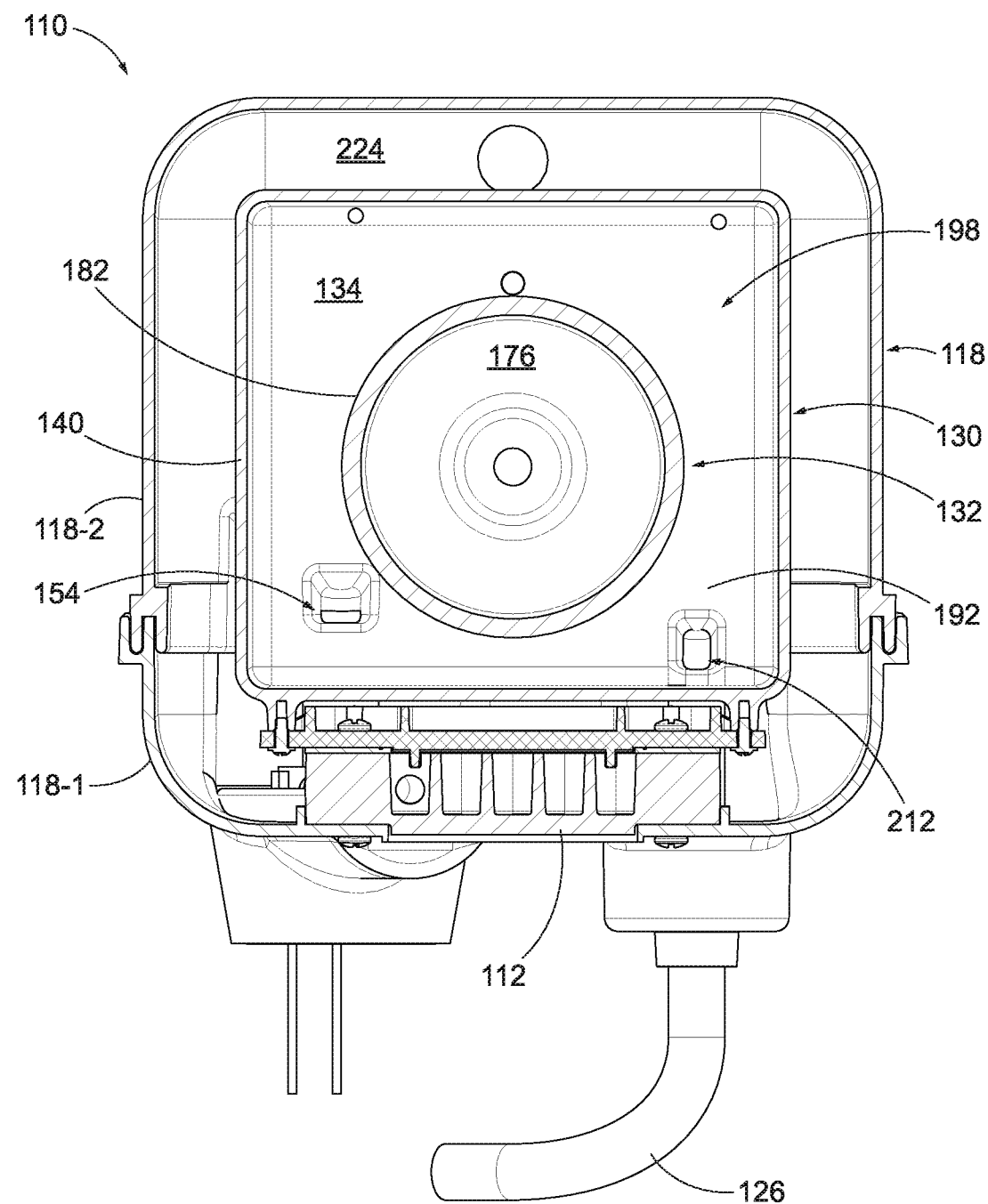
FIG. 11 is a cross-sectional view of the carbonation system of FIG. 2 taken along line 11-11 in FIG. 2 in accordance with various embodiments of the present disclosure.

As illustrated in FIG. 5, the cooling system 112 can include a cooling block 148 including an inlet port 150 for receiving precursor liquid from the liquid tank 130 and an outlet port 152 for transferring chilled precursor liquid to the liquid tank 130. The inlet port 150 can be coupled to an outlet port 154 of the liquid tank 130 (see FIG. 5) via, for example, a tube 156 (see FIG. 4). As illustrated in FIG. 4, a pump 158 can be associated with the tube 156 to facilitate movement of the precursor liquid from the liquid tank 130, through the cooling system 112, and back into the liquid tank 130. As illustrated in FIG. 3, a temperature sensor (e.g., a thermistor) 160 can be configured to measure the temperature of the precursor fluid in the liquid tank 130, and control circuitry can use the information from the temperature sensor 160 to activate the pump 158 to flow precursor liquid through the cooling system 112 to cool the precursor liquid to a desired temperature for carbonation. Referring to FIG. 5, the outlet port 152 of the cooling block 148 can be coupled to an inlet port 162 of the liquid tank 130 via, for example, a tube 164 (see FIG. 4). The inlet port 162 can be positioned above the outlet port 154 of the liquid tank 130, and as illustrated in FIG. 5 the inlet port 162 can be located at or near a top of the liquid tank 130 whereas the outlet port 154 can be located at or near a bottom of the liquid tank 130. For example, as illustrated in FIG. 11, the outlet port 154 can be formed in the bottom wall 192 of the liquid tank 130.

Figure 7:
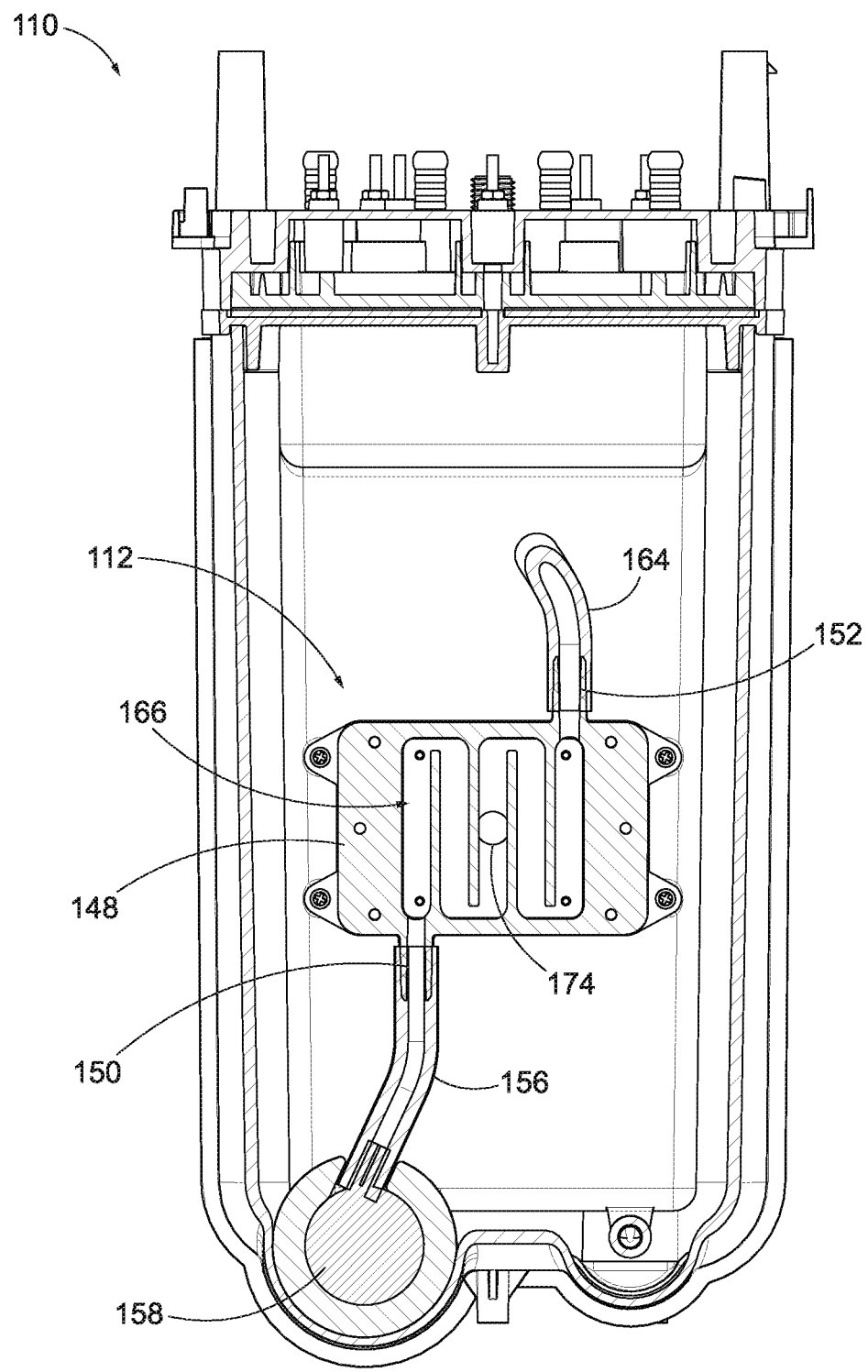
FIG. 7 is a cross-sectional view of the carbonation system of FIG. 2 taken along line 7-7 in FIG. 2 and illustrating a cooling system in accordance with various embodiments of the present disclosure.

FIG. 6 is a partially exploded view of the cooling system 112, and FIG. 7 is a cross-sectional view of the cooling system 112 taken along line 7-7 in FIG. 2, in accordance with various embodiments of the present disclosure. As illustrated in FIG. 7, a flow channel 166 can be formed in the cooling block 148. The flow channel 166 can extend in a tortuous path and can be configured to cool the precursor liquid as the liquid travels through the flow channel 166. The precursor liquid can flow into the flow channel 166 from the inlet port 150 of the cooling block 148, and the cooled liquid can exit the cooling block 148 out of the outlet port 152. As illustrated in FIG. 6, to facilitate formation of the flow channel 166, the cooling block 148 can be formed as two separate components: a body 170 and a face plate 172 that is attachable to the body 170. The cooling block 148, including the body 170 and the face plate 172, can be attached to the liquid tank 130 via, for example, one or more fasteners.

The precursor liquid can be sterilized in the cooling block 148. For example, as illustrated in FIG. 6, a hygiene system 174 can be attached to the cooling block 148. In various embodiments, the hygiene system 174 includes an ultraviolet light source, such as an ultraviolet light emitting diode, configured to sterilize the precursor liquid. As illustrated in FIG. 7, the hygiene system 174 can be aligned with the flow channel 166 to sterilize the precursor liquid as it flows through the flow channel 166.

Referring back to FIG. 4, the carbonation tank 132 can be configured to carbonate the precursor liquid with a gas, such as carbon dioxide. The carbonation tank 132 can define a carbonation chamber 176 for receiving chilled liquid from the liquid tank 130 and carbonating gas from a gas source. The carbonation tank 132 can include an outlet end 178, an inlet end 180, and a sidewall 182 extending between the outlet end 178 and the inlet end 180. The sidewall 182 can have a cylindrical shape as illustrated in FIG. 4, and the sidewall 182 can taper inwardly as it approaches the outlet end 178 of the carbonation tank 132. The outlet end 178 can extend through an aperture formed in the bottom of the liquid tank 130 and the outer shell 118 to form the carbonated-liquid outlet 116 (see FIG. 3) of the carbonation system 110. As illustrated in FIG. 4, one or more sealing elements (e.g., O-rings) 183 can be attached to the outlet end 178 of the carbonation tank 132 to form a fluid-tight seal with the bottom of the liquid tank 130 to prevent leakage of the precursor liquid through the interface between the liquid tank 130 and the carbonation tank 132. A flange 184 can extend outwardly from the sidewall 182 at the inlet end 180 of the carbonation tank 132 to facilitate attachment of the carbonation tank 132 to the cover 120. A gasket can be positioned between the cover 120 and the flange 184 to provide a fluid-tight seal between the cover 120 and the carbonation tank 132. The cover 120 can be removably attached to the carbonation tank 132, such as by fasteners that connect the cover 120 to the flange 184 of the carbonation tank 132. By its attachment to the liquid tank 130 and the carbonation tank 132, the cover 120 can limit relative movement between the upper end 138 of the liquid tank 130 and the inlet end 180 of the carbonation tank 132.

The carbonation tank can be configured to withstand pressure. As previously discussed, carbonating gas and precursor liquid can be directed into the carbonation tank 132. In various embodiments, the pressure inside of the carbonation tank 132 can exceed 90 PSI, and the pressure within the carbonation tank 132 can cycle between ambient pressure when the carbonation system is not in use to approximately 90-100 PSI when the carbonation system is dissolving gas in liquid in the carbonation tank 132.

To withstand the pressure forces, the sidewall 182 of the carbonation tank 132 can be relatively thick. In various embodiments, the carbonation tank 132 is formed from plastic, such as polyethylene terephthalate (PET), which advantageously reduces the cost of the carbonation tank 132. In these embodiments, the thickness of the sidewall 182 can be about 3.2 millimeters, for example. The carbonation tank 132 can include buttresses or ribs 186 extending between the sidewall 182 and the flange 184 to strengthen the attachment of the flange 184 to the cover 120 to ensure the carbonation tank 132 remains attached to the cover 120 during pressurization of the carbonation tank 132.

As illustrated in FIGS. 5 and 6, the carbonation tank 132 can be positioned (e.g., nested) in the liquid tank 130. By positioning the carbonation tank 132 in the liquid tank 130, the outer envelope or volume of the carbonation system 110 is reduced, enabling the carbonated beverage machine 100 to have a smaller footprint than previous carbonated beverage machines. Additionally, the carbonation tank 132 can be cooled externally by chilled precursor liquid (e.g., water) in the liquid tank 130 and internally by chilled precursor liquid transferred from the liquid tank 130 to the carbonation tank 132, resulting in a communal environment having substantially the same temperature, thereby creating thermal benefits in maintaining a proper carbonation temperature in the carbonation tank 132.

Referring to FIGS. 5, 6, and 8-11, the carbonation tank 132 can be substantially entirely received inside the liquid tank 130. To secure the carbonation tank 132 within the liquid tank 130, the inlet end 180 of the carbonation tank 132 can be attached to the cover 120 via, for example, the flange 184 of the carbonation tank 132, and the upper end 138 of the liquid tank 130 can be attached to the cover 120 via, for example, the flange 142 of the liquid tank 130. The attachment of the respective ends of the liquid tank 130 and the carbonation tank 132 to the cover 120 generally limits movement of the carbonation tank 132 relative to the liquid tank 130.

Figure 8:
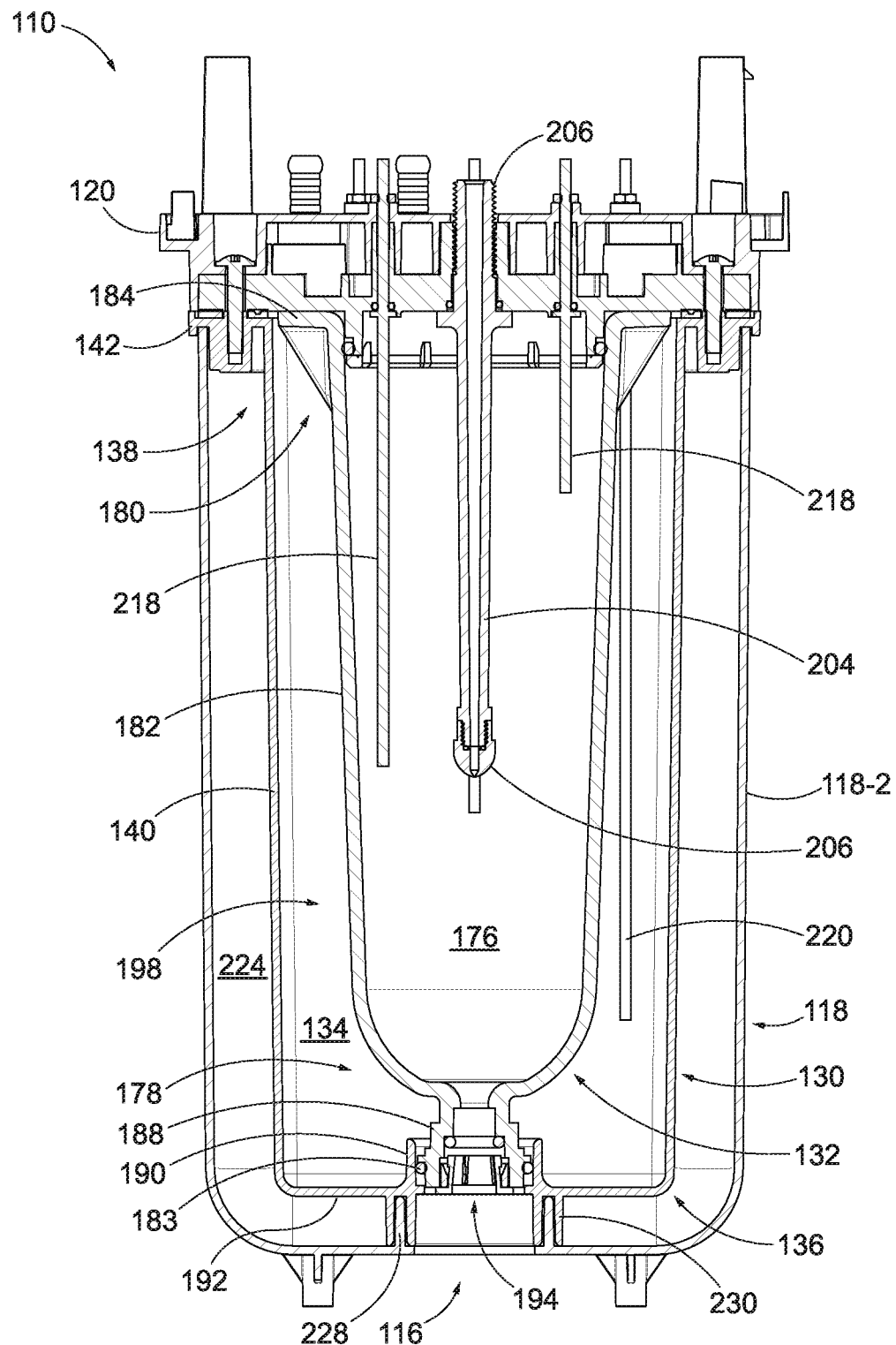
FIG. 8 is a cross-sectional view of the carbonation system of FIG. 2 taken along line 8-8 in FIG. 2 in accordance with various embodiments of the present disclosure.
Figure 9:
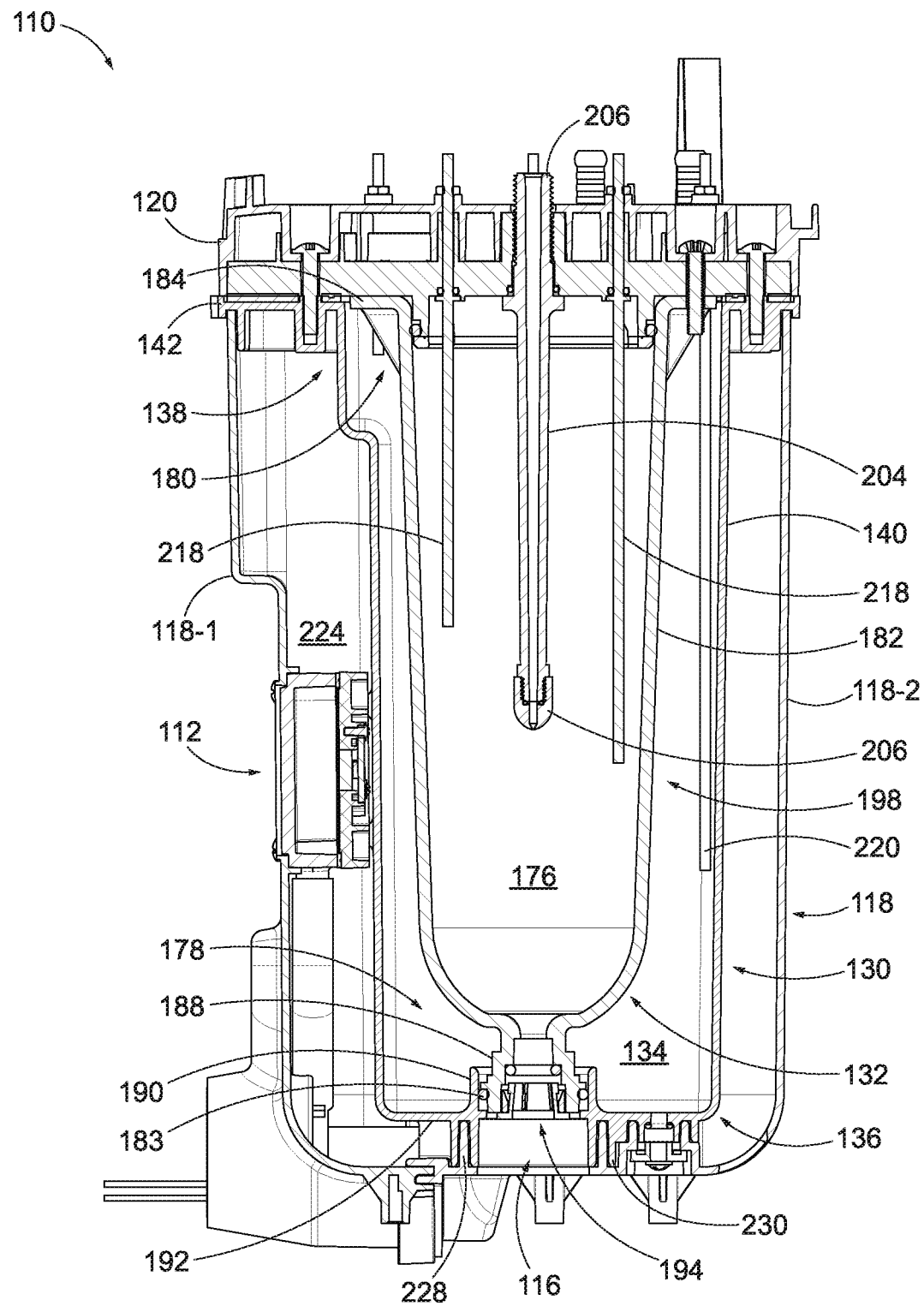
FIG. 9 is a cross-sectional view of the carbonation system of FIG. 2 taken along line 9-9 in FIG. 2 in accordance with various embodiments of the present disclosure.
Figure 10:
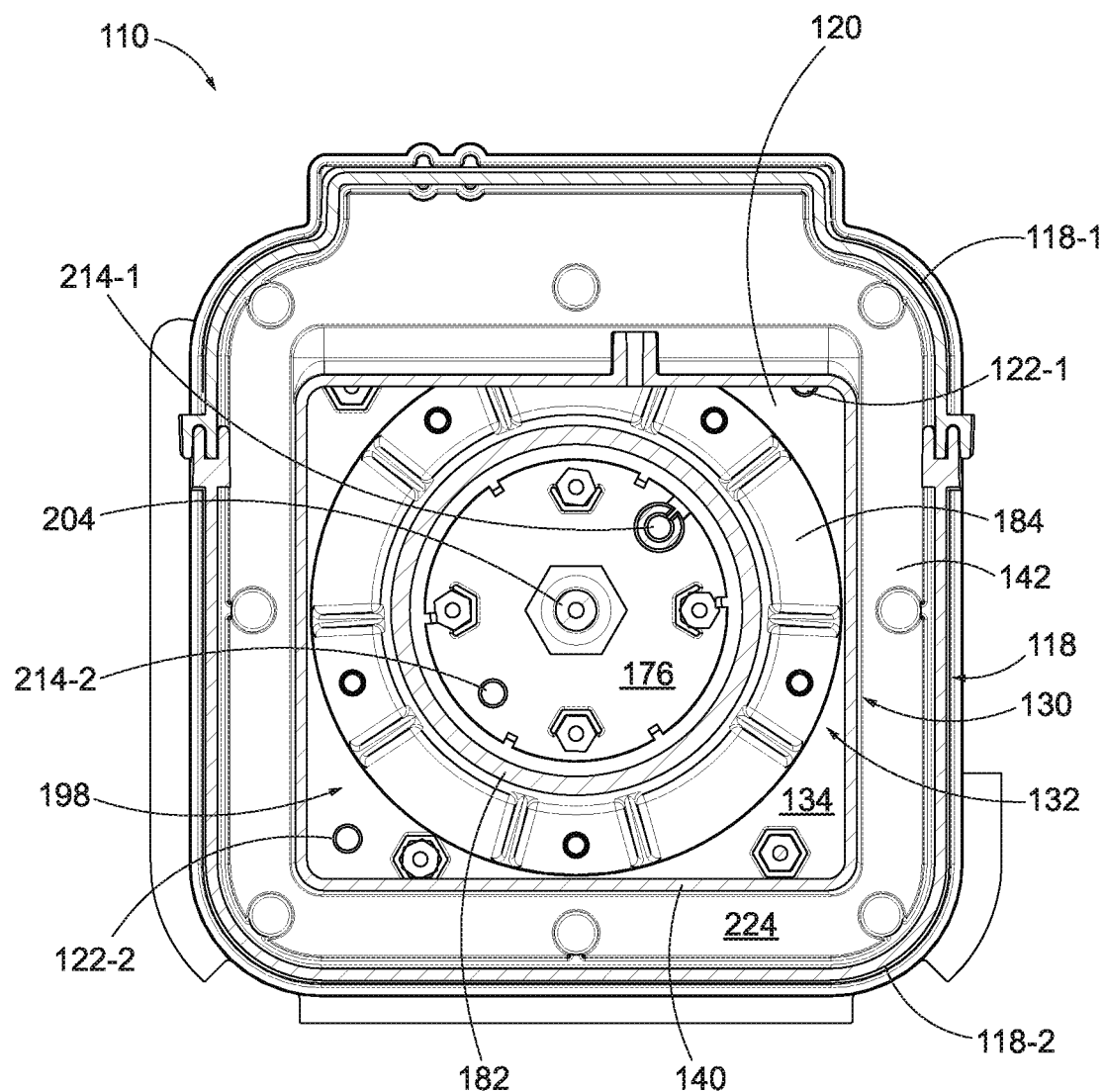
FIG. 10 is a cross-sectional view of the carbonation system of FIG. 2 taken along line 10-10 in FIG. 2 in accordance with various embodiments of the present disclosure.

To further secure the carbonation tank 132 within the liquid tank 130, the outlet end 178 of the carbonation tank 132 can engage the lower end 136 of the liquid tank 130. For example, as illustrated in FIGS. 8 and 9, the outlet end 178 of the carbonation tank 132 can include a nozzle 188 that is received within a boss 190 projecting from a bottom wall 192 of the liquid tank 130. The sealing element 183 can engage the nozzle 188 and the boss 190 to form a fluid-tight seal between the outlet end 178 of the carbonation tank 132 and the lower end 136 of the liquid tank 130, thereby ensuring the precursor liquid is retained in the liquid tank 130 around the carbonation tank 132 without leaking through the interface between the outlet end 178 of the carbonation tank 132 and the lower end 136 of the liquid tank 130. To control the flow of carbonated liquid through the outlet end 178 of the carbonation tank 132, a valve 194 can be received in the nozzle 188.

Referring to FIGS. 8-11, the carbonation tank 132 can be insulated. For example, an annular space 198 can be defined between the liquid tank 130 and the carbonation tank 132. The annular space 198 can extend between the sidewall 140 of the liquid tank 130 and the sidewall 182 of the carbonation tank 132. The precursor liquid can be received in the annular space 198, thereby surrounding the carbonation tank 132. In this manner, the liquid tank 130 can define an insulating region around the carbonation tank 132. As previously discussed, the precursor liquid can be chilled by the cooling system 112, and thus the chilled liquid can facilitate maintaining a proper carbonation temperature in the carbonation tank 132. For example, the carbonation chamber 176 can be separated from the liquid chamber by the sidewall 182 of the carbonation tank 132, and thus thermal conduction through the sidewall 182 can regulate the temperature of the carbonation chamber 176 relative to the liquid chamber 134.

The carbonation tank 132 can form part of a carbonator 200 (see FIG. 4), which in various embodiments is designed to dissolve carbon dioxide gas in water, producing carbonated water. Carbon dioxide gas can be delivered through a regulator to the carbonation tank 132. As illustrated in FIGS. 4 and 8-10, the carbonator 200 can include a stem (e.g., a sparge stem) 204 for delivering the pressurized gas (e.g., carbon dioxide) to the carbonation tank 132. The stem 204 can be elongate and can define the port 124 (see FIG. 2) for delivering the carbonating gas to the carbonation tank 132. The stem 204 can be attached at an upper end 206 to the cover 120 and can include a free lower end 208 configured for delivery of the gas to the carbonation tank 132. The upper end 206 can be configured for attachment to a gas supply line, and can be threaded to facilitate connection to the cover 120 and the gas supply line.

Substantially simultaneously with introduction of the carbonating gas into the carbonation tank 132, liquid (e.g., chilled plain water) can be pumped into the carbonation tank 132. The pressurized gas (e.g., carbon dioxide) dissolves in the liquid, resulting in carbonated liquid (e.g., carbonated water). In various embodiments, the liquid tank 130 can be configured to receive precursor liquid from the reservoir 104 (see FIG. 1). For example, as illustrated in FIG. 2, the cover 120 can include one or more ports 122 (for example, ports 122-1, 122-2) that are in fluid communication with the liquid chamber 134 of the liquid tank 130 (see, e.g., FIG. 10). One or more of the ports 122 can be coupled to the reservoir 104 via a tube, and precursor liquid (e.g., plain water) can be pumped into the liquid chamber 134 of the liquid tank 130. As previously discussed, the precursor liquid can be cooled by the cooling system 112 to a desired carbonation temperature.

The chilled precursor liquid (e.g., chilled plain water) can be pumped from the liquid tank 130 to the carbonation tank 132. For example, the chilled precursor liquid can be pumped from the liquid chamber 134 through a drain port 212 formed in the bottom wall 192 of the liquid tank 130 (see FIG. 11), through the drain tube 126 (see FIGS. 2 and 11), and into the carbonation chamber 176 of the carbonation tank 132 via one or more ports 214 (e.g., ports 214-1, 214-2) in fluid communication with the carbonation chamber 176 (see FIGS. 2 and 10). The pressurized gas (e.g., carbon dioxide) dissolves in the liquid (e.g., chilled water), resulting in carbonated liquid (e.g., carbonated water).

When the level of carbonated liquid reaches a pre-determined point, a liquid level sensing device inside the carbonation tank 132 can send a signal to a liquid level control module, which in turn can shut off a pump motor associated with the chilled liquid supply line and can close a valve associated with the gas supply line. As carbonated liquid is drawn from the carbonation tank 132, the level of carbonated liquid drops in the carbonation tank 132. At a certain point, the liquid level sensing device recognizes the drop in the level and turns on the pump motor to replenish the amount of chilled liquid that has been taken out of the carbonation tank 132 and opens the valve associated with the gas supply line to provide more carbonating gas to the replenished chilled liquid.

As illustrated in FIGS. 8 and 9, the liquid level sensing device can include multiple probes 218 positioned in the carbonation chamber 176 for detecting the level of carbonated liquid in the carbonation chamber 176 of the carbonation tank 132. Similarly, multiple probes 220 can be positioned in the liquid chamber 134 of the liquid tank 130 for detecting the level of precursor liquid in the liquid chamber 134. The probes 218, 220 can attached to the cover 120 and extend downwardly into their respective chambers 176, 134.

The liquid tank 130 can be insulated for thermal benefits in maintaining the precursor liquid in the liquid chamber 134 at a desired chilled temperature. For example, as illustrated in FIGS. 8-11, the outer shell 118 can be positioned around the liquid tank 130 and can define an annular space 224 between the outer shell 118 and the liquid tank 130. The annular space 224 can form an air gap between the outer shell 118 and the liquid tank 130 to insulate the liquid tank 130, thereby providing thermal benefits for the carbonation system 110. As illustrated in FIG. 9, the cooling system 112 can be positioned in the annular space 224 defined between the outer shell 118 and the liquid tank 130.

To connect the outer shell 118 to the liquid tank 130, an upper end of the outer shell 118 can be attached to the flange 142 of the liquid tank 130, and a lower end of the outer shell 118 can be attached to the bottom wall 192 of the liquid tank 130. As illustrated in FIGS. 8 and 9, the outer shell 118 can snugly fit around a portion of the flange 142 to limit relative lateral movement of the outer shell 118 relative to the liquid tank 130. In various embodiments, the outer shell 118 can be attached to the flange 142 with, for example, adhesive and/or mechanical fasteners.

As illustrated in FIGS. 8 and 9, the outer shell 118 can define an upwardly projecting boss 228 that is engaged with the lower end 136 of the liquid tank 130 to limit lateral movement of the lower end 136 of the liquid tank 130 relative to the outer shell 118. The liquid tank 130 can include a boss 230 that projects downwardly from the bottom wall 192 of the liquid tank 130, and the boss 230 can engage the upwardly projecting boss 228 of the outer shell 118 to limit relative movement between the lower end of the liquid tank 130 and the outer shell 118. The boss 230 of the liquid tank 130 can at least partially define the outlet 116 of the carbonation system 110.

In use, a user can select a carbonated beverage from a display on the beverage machine 100 to begin the beverage preparation process. In response to receiving a beverage selection, the beverage machine 100 can transfer an amount of liquid (e.g., plain water) from the reservoir 104 to the carbonation system 110 based on the user's beverage selection. The liquid can be received in the liquid chamber 134 of the liquid tank 130, and the cooling system 112 can flow the liquid from the liquid chamber 134, through the cooling block 148, and back into the liquid chamber 134 until the liquid is chilled to a proper temperature for carbonation.

The chilled liquid can be transferred (e.g., pumped) from the liquid chamber 134 of the liquid tank 130 to the carbonation chamber 176 of the carbonation tank 132, which can be positioned in the liquid chamber 134. Additionally, a carbonating gas (e.g., carbon dioxide) can be introduced into the carbonation chamber 176 from a gas source (e.g., a bottle or canister of pressurized carbon dioxide). The carbonating gas can dissolve into the liquid, thereby creating a carbonated liquid (e.g., carbonated water). The carbonated liquid can be transferred (e.g., pumped) from the carbonation chamber 176 of the carbonation tank 132 to a dispensing station 108 of the beverage machine 100, where the carbonated water can be combined with a flavoring agent and dispensed into a container for the user.

As previously discussed, the carbonation system 110 can include a liquid chamber 134 and a carbonation chamber 176. The carbonation chamber 176 can be positioned in or adjacent to the liquid chamber 134. For example, the carbonation chamber 176 can be separated from the liquid chamber 134 by a wall, such as the sidewall 182 of the carbonation chamber 176. In various embodiments, the carbonation chamber 176 is located in the liquid chamber 134. In various embodiments, the carbonation chamber 176 borders the liquid chamber 134 such that the carbonation chamber 176 and the liquid chamber 134 share a wall. The liquid chamber 134 can be defined by the liquid tank (e.g., water tank) 130, and the carbonation chamber 176 can be defined by the carbonation tank 132. The carbonation system 110 can move a liquid (e.g., water) from the liquid chamber 134 to the carbonation chamber 176 and introduce carbonating gas (e.g., carbon dioxide) into the carbonation chamber 176 to create a carbonated liquid (e.g., carbon dioxide water dissolution, such as carbonated water, sparkling water, or seltzer).

In various embodiments, the carbonation tank 132 is positioned in (e.g., nested within) the liquid tank 130. Certain advantages can be provided by positioning the carbonation tank 132 in the liquid tank 130. For example, by positioning the carbonation tank 132 in the liquid tank 130, the outer envelope or volume of the carbonation system 110 is reduced, enabling the carbonated beverage machine 100 to have a smaller footprint than previous carbonated beverage machines, thereby occupying less of a user's countertop space, for example. As another example, by positioning the carbonation tank 132 in the liquid tank 130, the carbonation tank 132 can be cooled externally by liquid (e.g., water) in the liquid tank 130 and internally by liquid transferred from the liquid tank 130 to the carbonation tank 132, resulting in a communal environment having substantially the same temperature, thereby creating thermal benefits in maintaining a proper carbonation temperature in the carbonation tank 132.

The foregoing description has broad application. The discussion of any embodiment is meant only to be explanatory and is not intended to suggest that the scope of the disclosure, including the claims, is limited to these examples. In other words, while illustrative embodiments of the disclosure have been described in detail herein, the inventive concepts can be otherwise variously embodied and employed, and the appended claims are intended to be construed to include such variations, except as limited by the prior art.

The foregoing discussion has been presented for purposes of illustration and description and is not intended to limit the disclosure to the form or forms disclosed herein. For example, various features of the disclosure are grouped together in one or more aspects, embodiments, or configurations for the purpose of streamlining the disclosure. However, various features of the certain aspects, embodiments, or configurations of the disclosure can be combined in alternate aspects, embodiments, or configurations. Moreover, the following claims are hereby incorporated into this Detailed Description by this reference, with each claim standing on its own as a separate embodiment of the present disclosure.

All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the present disclosure, and do not create limitations, particularly as to the position, orientation, or use. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other. Identification references (e.g., primary, secondary, first, second, third, fourth, etc.) are not intended to connote importance or priority, but are used to distinguish one feature from another. The drawings are for purposes of illustration only and the dimensions, positions, order, and relative sizes reflected in the drawings attached hereto can vary.

What is claimed is:

1. A carbonation system for a beverage machine, comprising:
   a liquid tank; and
   a carbonation tank positioned in the liquid tank;
   a cooling system mounted to a sidewall of the liquid tank, the cooling system comprising a flow channel; and
   a hygiene system aligned with the flow channel.

2. The carbonation system of claim 1, further comprising an annular space defined between the liquid tank and the carbonation tank.

3. The carbonation system of claim 2, wherein the liquid tank is configured to receive liquid in the annular space surrounding the carbonation tank.

4. The carbonation system of claim 3, wherein the carbonation system is configured to move the liquid from the liquid tank to the carbonation tank and introduce pressurized gas to the carbonation tank.

5. The carbonation system of claim 1, further comprising a cover attached to the liquid tank and the carbonation tank;

wherein the cover is configured to limit relative movement between the liquid tank and the carbonation tank.

6. The carbonation system of claim 5, wherein the cover comprises:
 a first port in fluid communication with the liquid tank; and
 a second port in fluid communication with the carbonation tank.

7. The carbonation system of claim 5, further comprising a stem positioned in the carbonation tank and attached to the cover;
 wherein the stem is configured for introducing pressurized gas into the carbonation tank.

8. The carbonation system of claim 5, further comprising:
 a first probe attached to the cover and extending into the liquid tank to determine a liquid level in the liquid tank; and
 a second probe attached to the cover and extending into the carbonation tank to determine a liquid level in the carbonation tank.

9. A carbonation system for a beverage machine, comprising:
 a liquid chamber;
 a carbonation chamber including a wall, the wall separating the carbonation chamber from the liquid chamber; and
 a cooling system configured to cool a liquid in the liquid chamber, the cooling system comprising a cooling block coupled to an exterior surface of the liquid chamber, the cooling block including an inlet port for receiving a precursor liquid from the liquid tank and an outlet portion for transferring a chilled precursor liquid back to the liquid tank.

10. The carbonation system of claim 9, wherein the carbonation chamber is disposed in the liquid chamber.

11. The carbonation system of claim 9, wherein the liquid chamber is configured to receive a liquid such that the liquid contacts the wall of the carbonation chamber.

12. The carbonation system of claim 9, wherein:
 the carbonation system further includes a cover forming a barrier between the liquid and carbonation chambers and an external environment; and
 the carbonation chamber is fluidly coupled to the liquid chamber via the cover.

13. The carbonation system of claim 9, further comprising a shell surrounding the carbonation and liquid chambers.

14. A carbonation system for a beverage machine, comprising:
 a carbonation tank;
 a liquid tank defining an insulating region around the carbonation tank;
 a cooling system comprising a cooling block attached to the liquid tank; and
 a hygiene system comprising an ultraviolet light source attached to the cooling block.

15. The carbonation system of claim 14, wherein the carbonation tank is nested within the liquid tank.

16. The carbonation system of claim 14, wherein the insulating region comprises an annular space between the carbonation tank and the liquid tank configured to receive a chilled liquid.

17. The carbonation system of claim 14, wherein the liquid and carbonation tanks are fluidically coupled for selective transfer of a chilled liquid from the liquid tank to the carbonation tank.

18. The carbonation system of claim 17, further comprising a stem received at least partially within the carbonation tank and configured to introduce pressurized gas into the carbonation tank when the carbonation tank has a threshold volume of the chilled water.

* * * * *